(12) United States Patent
Fukuhara et al.

(10) Patent No.: US 7,142,722 B2
(45) Date of Patent: Nov. 28, 2006

(54) IMAGE CODING DEVICE AND CODING METHOD OF SAME

(75) Inventors: Takahiro Fukuhara, Kanagawa (JP); Seiji Kimura, Chiba (JP); Junya Araki, Tokyo (JP)

(73) Assignee: Sony Corporation, Tokyo (JP)

( * ) Notice: Subject to any disclaimer, the term of this patent is extended or adjusted under 35 U.S.C. 154(b) by 725 days.

(21) Appl. No.: 10/361,691

(22) Filed: Feb. 11, 2003

(65) Prior Publication Data

US 2003/0163209 A1   Aug. 28, 2003

(30) Foreign Application Priority Data

Feb. 12, 2002   (JP)   ............................. 2002-033631

(51) Int. Cl.
    *G06K 9/36*   (2006.01)
(52) U.S. Cl. .................... 382/240; 382/232; 382/247
(58) Field of Classification Search .............. 382/240, 382/232, 235, 236, 237, 238, 239, 244, 245, 382/246, 247, 248, 250, 251; 702/76; 348/441; 375/240.01; 358/1.9
See application file for complete search history.

(56) References Cited

U.S. PATENT DOCUMENTS

| | | | | |
|---|---|---|---|---|
| 5,315,670 | A * | 5/1994 | Shapiro | 382/240 |
| 5,321,776 | A * | 6/1994 | Shapiro | 382/240 |
| 5,604,824 | A * | 2/1997 | Chui et al. | 382/248 |
| 5,737,448 | A * | 4/1998 | Gardos | 382/240 |
| 6,229,927 | B1 * | 5/2001 | Schwartz | 382/248 |
| 6,263,109 | B1 * | 7/2001 | Ordentlich et al. | 382/232 |
| 6,510,247 | B1 * | 1/2003 | Ordentlich et al. | 382/232 |
| 6,549,666 | B1 * | 4/2003 | Schwartz | 382/233 |

FOREIGN PATENT DOCUMENTS

| | | |
|---|---|---|
| JP | 359178018 A * | 10/1984 |
| JP | 406217145 A * | 8/1994 |

OTHER PUBLICATIONS

Simon et al., "An Ultra Low Power Adaptive Wavelet Video Encoder with Integrated Memory", IEEE vol. 35, No. 4, Apr. 2000, pp. 572-582.*

* cited by examiner

*Primary Examiner*—Anh Hong Do
(74) *Attorney, Agent, or Firm*—Oblon, Spivak, McClelland, Maier & Neustadt, P.C.

(57) ABSTRACT

An image coding device for reducing flicker noise in moving image coding based on Motion JPEG-2000, which applies wavelet transform to an input image, quantizes the wavelet transform coefficients, and replaces quantization coefficients of adjacent frames in accordance with a predetermined judgment condition. The device spreads the finally output quantization coefficients into bit-planes from the MSB to LSB, generates coding passes in each bit-plane, performs arithmetic coding in the coding passes, controls the code quantity to a target code quantity from the generated arithmetic codes, and generates a packet of the image data by attaching a header to the arithmetic codes. The quantization coefficients are replaced based on a difference of absolute values of the quantization coefficients at the same sub-band in the adjacent frames. By further adding the wavelet transform coefficients, erroneous detection in the substitution processing can be decreased and the flicker noise can be suppressed effectively. Also, an image coding method for the same.

25 Claims, 11 Drawing Sheets

IMAGE OF PRESENT FRAME

IMAGE OF ONE FLAME BEFORE

RESULT OF QUANTIZATION COEFFICIENT SUBSTITUTION JUDGEMENT

IMAGE CODING DEVICE AND CODING METHOD OF SAME

BACKGROUND OF THE INVENTION

1. Field of the Invention

The present invention relates to a coding device of moving images based on Motion JPEG-2000, the motion version of the still picture coding standard JPEG-2000, and a coding method of the same.

2. Description of the Related Art

The next generation still picture coding standard JPEG-2000, for which standardization work was completed in January 2001 by the ISO/IEC (International Organization for Standardization/International Electrotechnical Commission), has abundant functions such as a superior compression performance and also scalability, progressiveness, error tolerance, and reversible compression. Thus, it is expected to be widely used in the next generation of digital still cameras, printers, scanners, etc. On the other hand, the motion version of the JPEG-2000, that is, Motion JPEG-2000, inherits the superior features of the JPEG-2000 intact and is expected to find use in future camcoders, monitor cameras, Internet motion picture distribution, remote distribution of medical information, television conference systems, etc.

Motion JPEG-2000, however, deals with a succession of still images of JPEG-2000. With still images, in most cases there is no problem since the images do not move. With moving images, however, there is the problem of a remarkable deterioration in the image quality. Considered a particular problem in the deterioration of the image quality is the flicker noise caused by the occurrence of noise at random positions in a succession of frames.

Flicker noise is caused by, for example, a change in the quantization coefficients in a still region due to the influence of a slight noise component in the original image. In a still region, the quantization coefficients should not change. Despite this, for some reason, noise at the time of taking the picture with a camera etc. will cause noise in the image. The small noise component contained in the image signal will in turn cause the quantization coefficients to change. This will sometimes be detected as flicker noise.

SUMMARY OF THE INVENTION

An object of the present invention is to provide an image coding device, and a coding method thereof, able to reduce the flicker noise of coded images when compressing and coding moving images in accordance with the Motion JPEG-2000 standard.

To obtain the above object, according to a first aspect of the present invention, there is provided an image coding device comprising wavelet transform means for applying to an input image low-pass filtering and high-pass filtering in at least one of a vertical and horizontal direction, quantization means for quantizing transform coefficients generated by the wavelet transform means to generate quantization coefficients, storage means for storing the quantization coefficients, substitution means for comparing the stored quantization coefficients and the quantization coefficients of the current image for coding and replacing the quantization coefficients of the current image for coding with the stored quantization coefficients in accordance with the result of the comparison, spreading means for spreading the quantization coefficients output from the substitution means into bit-planes from the most significant bit (MSB) to least significant bit (LSB), coding pass generation means for generating coding passes for each bit-plane, and coding means for arithmetic coding of the coding passes.

Preferably, the substitution means has means for calculating a difference of absolute values between a quantization coefficient stored in the storage means and a quantization coefficient of the current image for coding and replacing the quantization coefficients when the difference of absolute values is smaller than a predetermined threshold value.

Alternatively, the substitution means has difference processing means for calculating a difference of absolute values of quantization coefficients at the same spatial positions of a sub-band generated by the wavelet transform means.

Preferably, in this case, the substitution means replaces the quantization coefficients when a ratio of the number of quantization coefficients having differences of absolute value calculated by the difference processing means smaller than a predetermined threshold value in the overall number of quantization coefficients is larger than a predetermined threshold value.

According to a second aspect of the present invention, there is provided an image coding device, comprising wavelet transform means for applying to an input image low-pass filtering and high-pass filtering in at least one of a vertical or horizontal direction and outputting wavelet transform coefficients, quantization means for quantizing the transform coefficients generated by the wavelet transform means and outputting quantization coefficients, storage means for storing the wavelet transform coefficients and the quantization coefficients, substitution means for comparing a stored quantization coefficient and a quantization coefficient of a current image for coding and further comparing a stored wavelet transform coefficient and a wavelet coefficient of a current image for coding and replacing the quantization coefficient of the current image for coding with the stored quantization coefficient in accordance with the results of the comparisons, spreading means for spreading the quantization coefficients output from the substitution means into bit-planes from the most significant bit (MSB) to least significant bit (LSB), coding pass generation means for generating coding passes for each bit-plane, and coding means for arithmetic coding in the coding passes.

Preferably, the substitution means compares a stored wavelet transform coefficient and a wavelet transform coefficient of the current image for coding at the same spatial positions in a sub-band generated by the wavelet transform and replaces the quantization coefficient of the current image for coding with the stored quantization coefficient when the values of both of the wavelet transform coefficients are within a range of a predetermined span.

Preferably, the wavelet transform means comprises storage means for storing image data of a predetermined image region and filtering means for applying to the storage image data wavelet transform filtering in the horizontal or vertical direction.

Preferably, the quantization means divides the wavelet transform coefficients by a quantization step size of a scalar value to calculate the quantization coefficients.

Preferably, the device further comprises code quantity control means for controlling a code quantity to a target code quantity according to arithmetic codes generated by the coding means.

Preferably, the coding pass generation means generates coding passes in each coding block of a predetermined size.

More preferably, the device further comprises code quantity control means for discarding part of all of the coding passes in each coding block according to the target code quantity.

Preferably, the device further comprises packet generation means for adding a header to the arithmetic codes generated by the coding means to generate a packet.

According to a third aspect of the present invention, there is provided an image coding method comprising the steps of applying to an input image low-pass filtering and high-pass filtering in at least one of a vertical and horizontal direction to generate wavelet transform coefficients, quantizing the wavelet transform coefficients generated by the wavelet transform to generate quantization coefficients, storing the quantization coefficients, comparing a stored quantization coefficient and a quantization coefficient of a current image for coding and replacing the quantization coefficient of the current image for coding with the stored quantization coefficient in accordance with the results of the comparison, spreading the quantization coefficients obtained from the substitution processing into bit-planes from the most significant bit (MSB) to least significant bit (LSB), generating coding passes for each bit-plane, and performing arithmetic coding in the coding passes.

According to a fourth aspect of the present invention, there is provided an image coding method comprising the steps of applying to an input image low-pass filtering and high-pass filtering in at least one of a vertical and horizontal directions to generate wavelet transform coefficients, quantizing the wavelet transform coefficients and outputting quantization coefficients, storing the wavelet transform coefficients and the quantization coefficients, comparing a stored quantization coefficient and a quantization coefficients of the current image for coding and further comparing a stored wavelet transform coefficient and a wavelet transform coefficients of the current image for coding and replacing the quantization coefficient of the current image for coding with the stored quantization coefficient in accordance with the results of the comparisons, spreading the quantization coefficients output from the substitution processing into bit-planes from the most significant bit (MSB) to the least significant bit (LSB), generating coding passes for each bit-plane, and performing arithmetic coding in the coding passes.

In summary, according to the present invention, the wavelet transform means forming a component of the image coding device performs filtering of the input images by a filter bank formed by low-pass and high-pass filters to calculate wavelet transform coefficients. In the wavelet transform, particularly the low frequency sub-bands can be recursively transformed to a plurality of levels. The quantization means performs the generally used scalar quantization, that is, divides the transform coefficients by a predetermined step size. The substitution means of the quantization coefficients compares the stored quantization coefficients with the quantization coefficients of the current image for coding and replaces the quantization coefficients of the current image for coding with the stored quantization coefficients in accordance with the results of the comparison.

Furthermore, according to the coding device and coding method of the present invention, the bit-plane coding pass generation means constructs bit-planes from MSB to LSB from the quantization coefficients in predetermined coding block units and performs processing of the coding passes. The arithmetic coding means starts from inside a coding pass and performs predetermined arithmetic coding while measuring statistical quantities and learning. Further, the coding quantity control means has the function of discarding parts of coding passes to approach the target coding quantity. Additionally, the package generation means has the function of adding to a data string of the arithmetic codes a header including attribute information of the data to generate a packet.

BRIEF DESCRIPTION OF THE DRAWINGS

The above and other objects and features of the present invention will become more apparent with reference to the accompanying drawings, in which.

DESCRIPTION OF THE PREFERRED EMBODIMENTS

Preferred embodiments of the present invention will be described in detail below while referring to the attached figures.

First Embodiment

Figure 1:
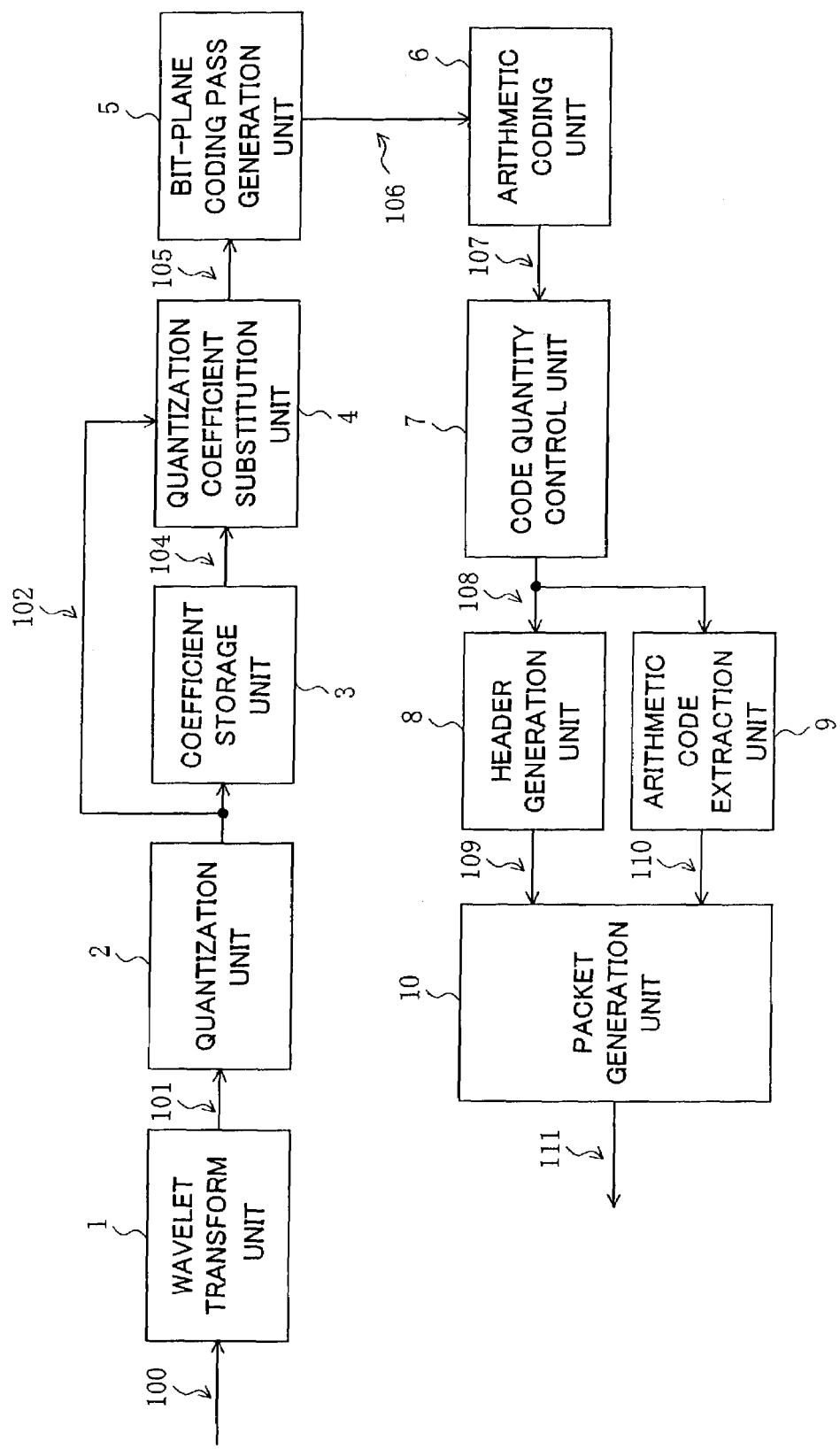
FIG. 1 is a block diagram of an image coding device according to a first embodiment of the present invention and shows in particular the configuration of a moving image coding device utilizing the JPEG-2000.

FIG. 1 is a block diagram of an image coding device according to a first embodiment of the present invention.

As illustrated, the image coding device of the present embodiment includes a wavelet transform unit 1, a quantization unit 2, a coefficient storage unit 3, a quantization coefficient substitution unit 4, a bit-plane coding pass generation unit 5, an arithmetic coding unit 6, a code quantity control unit 7, a header generation unit 8, an arithmetic code extraction unit 9, and a packet generation unit 10.

Next, the components of the image coding device of the present embodiment will be explained.

The wavelet transform unit 1 applies a wavelet transform to the input image signal 100. A wavelet transform is generally accomplished by a filter bank comprised by low-pass filters and high-pass filters. Therefore, since digital filters for wavelet transform generally have an in-pulse response (filter coefficients) of a plurality of tap lengths, it is necessary to buffer the exact number of input images which can be filtered in advance. Note that, in FIG. 1, illustration of the buffer memory for temporarily storing the input images temporarily is omitted.

The wavelet transform unit 1 receiving as input the minimum amount of the image signal 100 necessary for filtering from the buffer memory performs filtering for the wavelet transform and generates wavelet transform coefficients 101 as a result of the wavelet transform. The wavelet transform coefficients 101 are output into the quantization unit 2.

Figure 2:
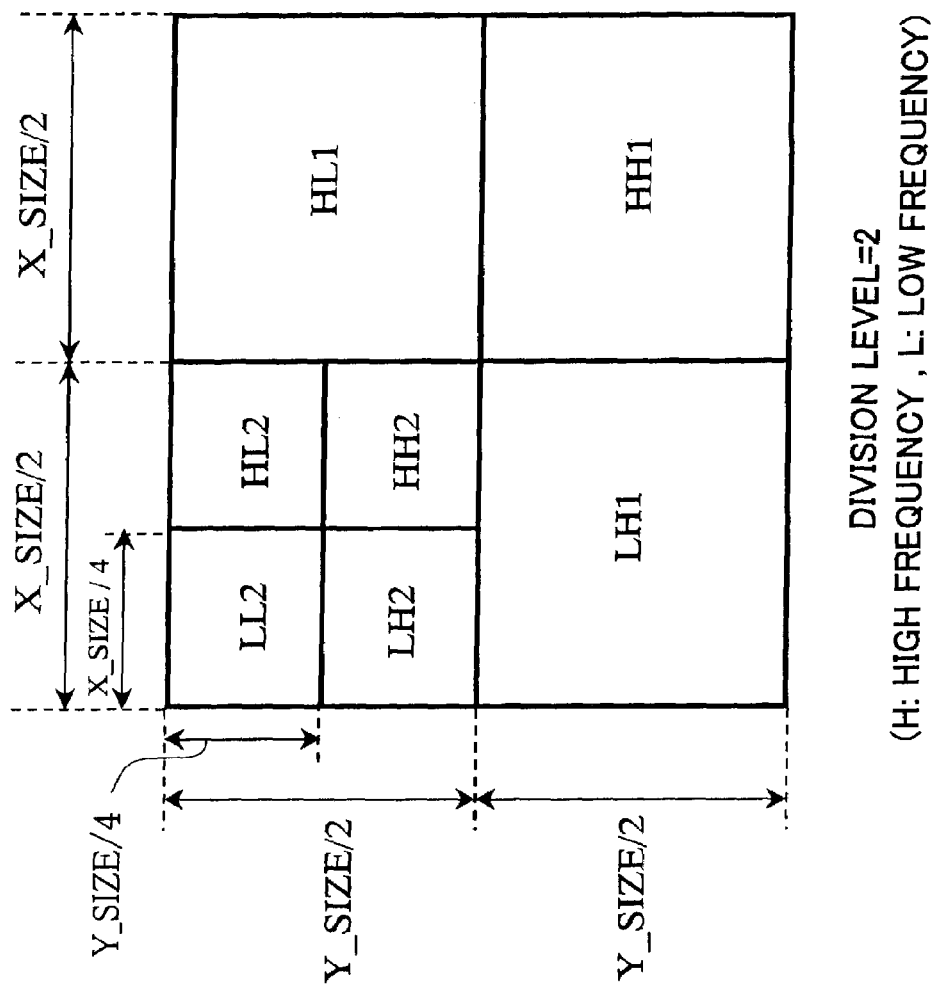
FIG. 2 is a diagram showing split wavelet transform and sub-bands.

As illustrated in FIG. 2, the wavelet transform generally consists of repeated transforms of low frequency elements (LL). This is because most of the energy of an image is concentrated in the low frequency elements. Further, in the case of FIG. 2, there are two levels of the wavelet transform. As a result, seven sub-bands LL2, LH2, HL2, HH2, LH1, HL1, and HH1 are generated. Among these, the sub-bands LL2, LH2, HL2, and HH2 are the results of wavelet transform on the not shown low frequency sub-band LL1.

The quantization unit 2 quantizes the wavelet transform coefficients 101 and outputs quantization coefficients 102. As illustrated, the quantization coefficients 102 are supplied to the coefficient storage unit 3 and the quantization coefficient substitution unit 4.

As a quantization means, scalar quantization dividing the wavelet transform coefficients 101 by the quantization step size is generally used.

The coefficient storage unit 3 stores the quantization coefficients 102 obtained from the quantization unit 2. Note that the storage time of the quantization coefficients in the coefficient storage unit 3 is the time from the input of the next frame for coding of the moving picture to the input of the quantization coefficients 102 of the next frame to the coefficient storage unit 3. That is, in general moving picture processing, the storage time of the coefficient storage unit 3 is roughly equal to the frame period of the input moving picture.

The quantization coefficient substitution unit 4 performs processing for substitution of the quantization coefficients of the present frame with those of the preceding frame by the processing explained later.

As illustrated, the quantization coefficients 104 of one frame before stored in the coefficient storage unit 3 are input to the quantization coefficient substitution unit 4. The quantization coefficient substitution unit 4 also receives as input the quantization coefficients 102 obtained from the image data of the current frame for coding. The quantization coefficient substitution unit 4 performs processing for substitution of the quantization coefficients by the processing explained later.

The quantization coefficients 105 output from the quantization coefficient substitution unit 4 are input to the bit-plane coding pass generation unit 5.

The bit-plane coding pass generation unit 5 performs entropy coding. In the present embodiment, particularly the entropy coding called "embedded coding with optimized truncation" (EBCOT) set in the JPEG-2000 standard will be explained as an example (see ISI/IEC FDIS 15444-1, JPEG-2000 Part-1 FDIS, Aug. 18, 2000).

Figure 3B:
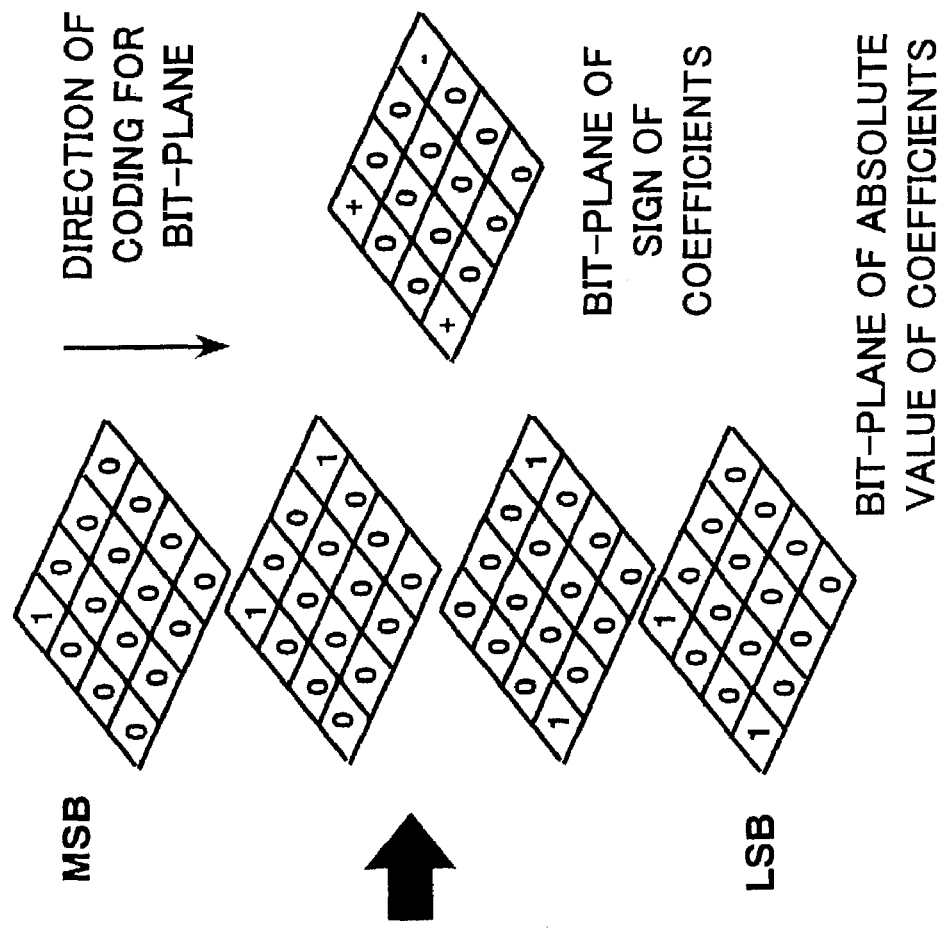
FIGS. 3A and 3B are views showing the bit-planes of the image coding process based on the JPEG-2000 standard.
Figure 3A:
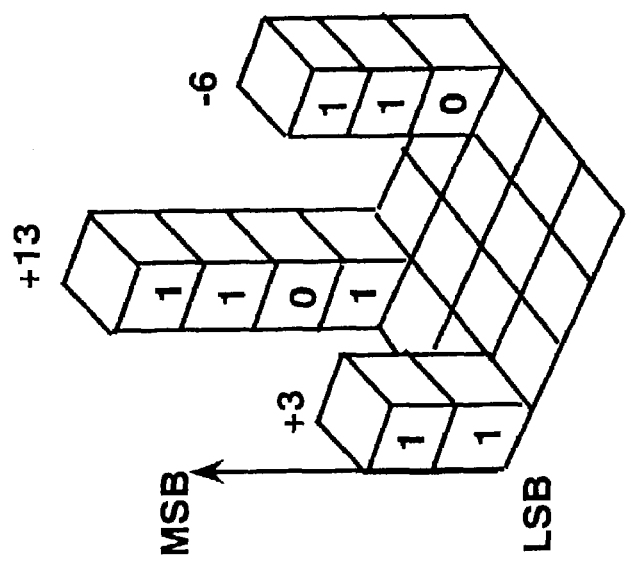

FIGS. 3A and 3B are views for explaining the concept of bit-planes.

In FIG. 3A, assume there are four quantization coefficients in the vertical direction and four in the horizontal direction, that is, a total of 16 coefficients. Among these 16 coefficients, the largest absolute value is 13, that is, 1101 by binary expression. Therefore, the bit-plane of the absolute value in FIG. 3B consists of four planes. It is obvious that all of the elements of the bit-planes are either "0" or "1". On the other hand, among the 16 coefficients, the only negative coefficient is the coefficient −6. The rest are either 0 or positive coefficients. Therefore, the bit-plane of the coefficient sign becomes that shown in FIG. 3B.

EBCOT is a means for measuring and coding the statistical amounts of coefficients in each block of a predetermined size. The quantization coefficients are entropy coded in block units of a predetermined size called "code blocks". A code block is coded independently for each bit-plane in the direction from MSB to LSB. The vertical and horizontal sizes of a code block are powers of 2 from 4 to 256. The normally used sizes are 32×32, 64×64, 128×128, etc. The coefficient value in the wavelet regions is shown by an n bit signed binary number wherein the bit 0 to bit n-2 show the bits from the LSB to MSB. The remaining 1 bit shows the sign. A code block is coded in order from the bit-plane of the MSB by the following three kinds of coding passes.

(1) Significance Pass
(2) Refinement Pass
(3) Cleanup Pass

Figure 4:
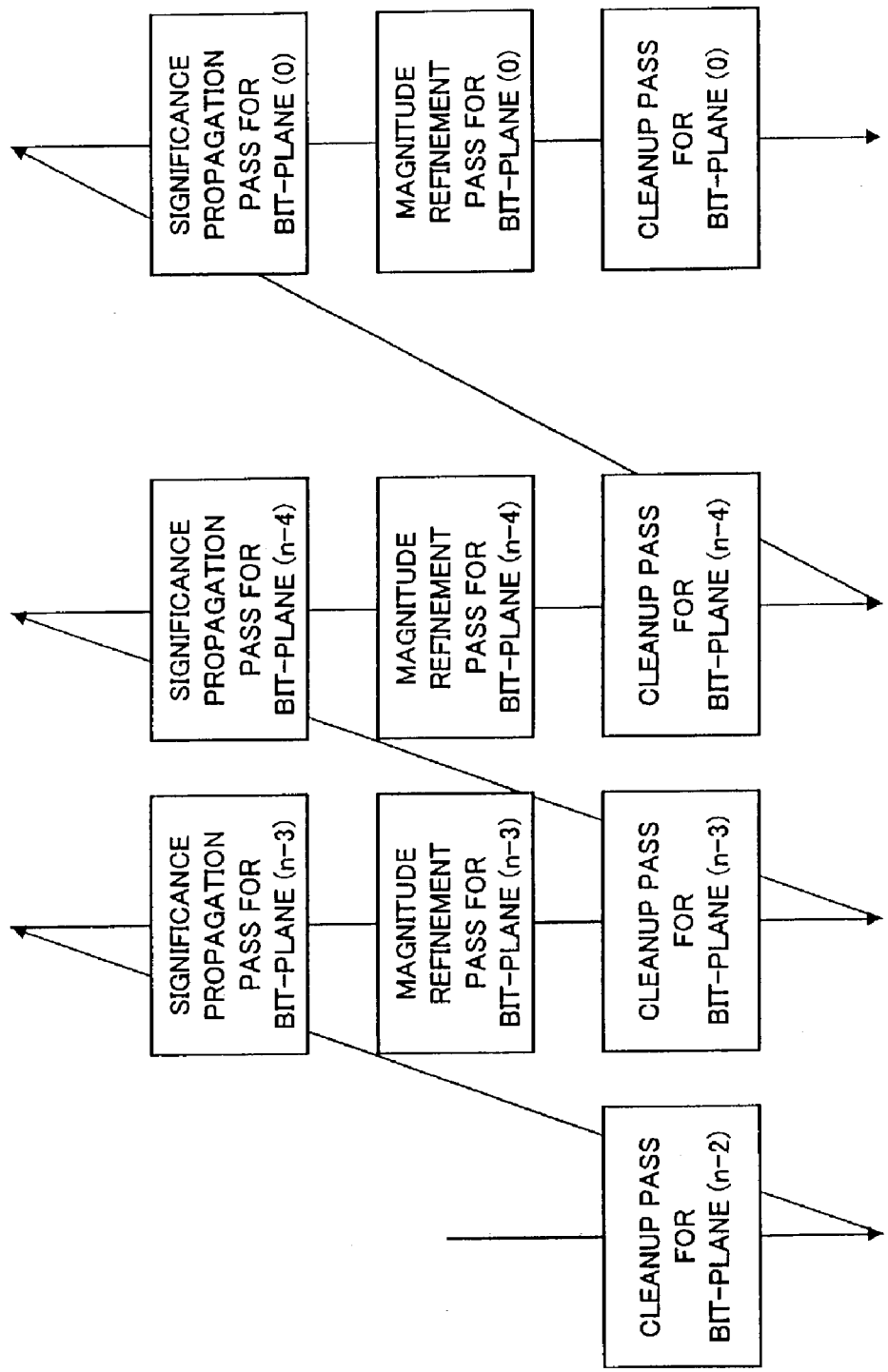
FIG. 4 is a view of the processing sequence of three coding passes of EBCOT.

FIG. 4 is a diagram showing the sequence used for the three coding passes. As illustrated in FIG. 4, the bit-plane n-2 (MSB) is coded by the cleanup pass first. Next, toward the LSB side, each bit-plane is coded using in the sequence of the three coding passes, that is, the significance pass, the refinement pass, and the cleanup pass.

However, in practice, which number bit-plane from the MSB side 1 first appears is written into the header, so an initial all 0 bit-plane is not coded. By repeatedly using the three types of coding passes in this order for coding and stopping the coding at any coding pass of any bit-plane, a tradeoff can be obtained between the amount of code and the image quality, that is, the bit rate can be controlled.

Figure 5:
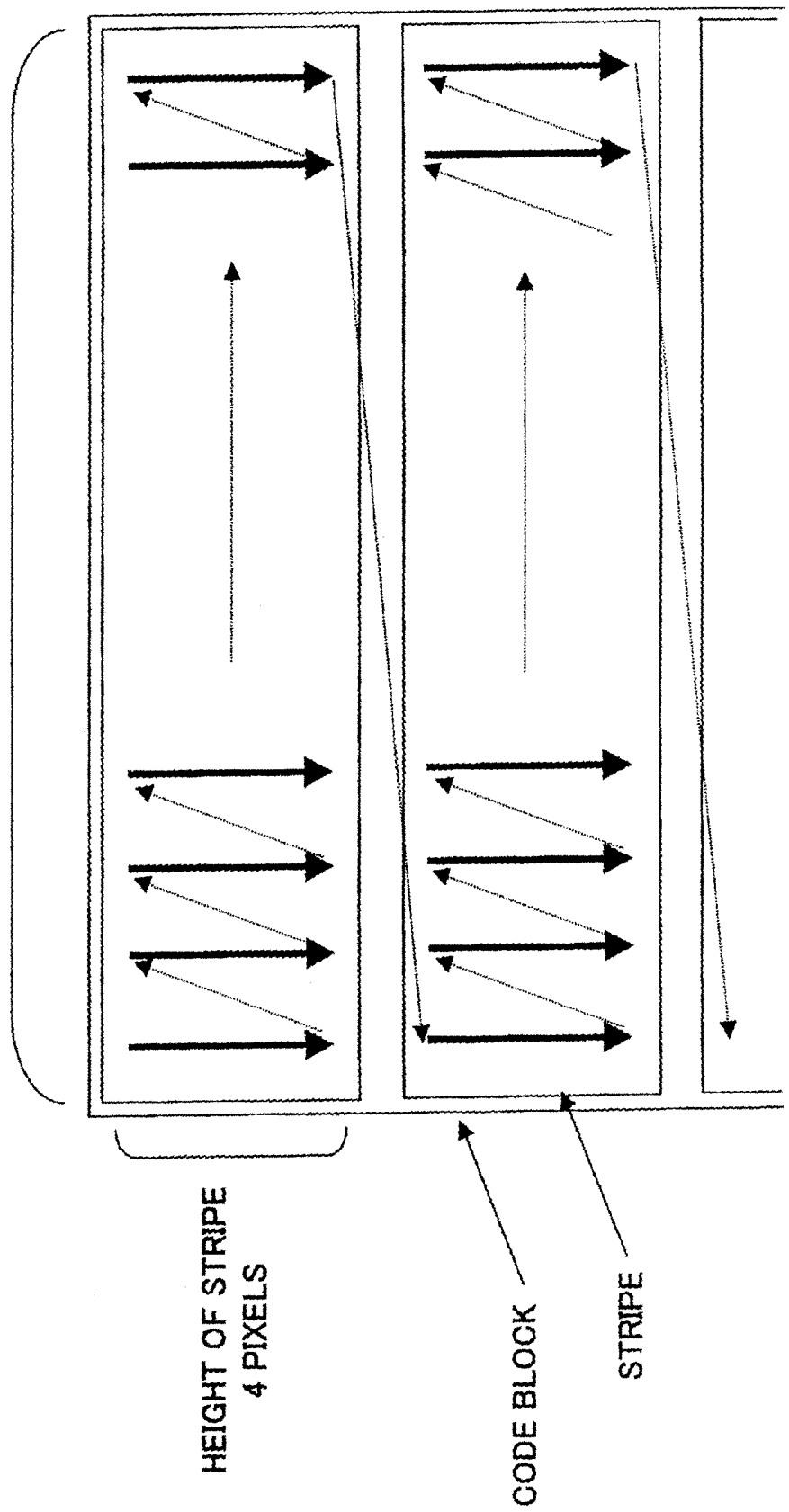
FIG. 5 is a view of the scan sequence of sampling of code blocks.

FIG. 5 is a view of scanning of coefficients. Scanning will be explained next with reference to FIG. 5.

A code block is divided into stripes each of a height of four coefficients. The width of each stripe is equal to the width of the code block. The scanning order is the order for scanning all the coefficients in one code block, that is, in a code block, the order from the top stripe to the bottom stripe, in a stripe, the order from the left column to the right column, and inside a column, the order from the top to the bottom.

All the coefficients of the code block are processed in this scanning order in each coding pass.

Next, the three coding passes will be described.

(1) Significance Pass

The significance pass for coding a certain bit-plane performs arithmetic coding of the value of a bit-plane of a non-significant coefficient so that at least one coefficient among the neighboring eight ones becomes significant. When the value of the coded bit-plane is 1, whether the sign is + or − is next arithmetically coded.

(2) Refinement Pass

The refinement pass for coding a bit-plane performs arithmetic coding of the value of a bit-plane of a significant coefficient not coded by the significance pass for coding the bit-plane.

(3) Cleanup Pass

The cleanup pass for coding a bit-plane performs arithmetic coding of the value of a bit-plane of a non-significant coefficient not coded by the significance pass for coding a bit-plane. When the value of the coded bit-plane is 1, whether the sign is + or − is next arithmetically coded.

Note that, for the arithmetic coding in the above three coding passes, ZC (zero coding), RLC (run-length coding), SC (sign coding), and MR (magnitude refinement) are selectively used in accordance with the case. Here, the arithmetic coding called "MQ coding" is used. MQ coding is a learning type binary arithmetic coding defined by JBIG2 (see ISO/IEC FDIS 14492, "Lossy/Lossless Coding of Bi-level Images", March 2000). In the JPEG-2000, there are 19 types of contexts in total for all of the coding passes.

Above, the bit-plane coding pass generation unit 5 in the image coding device shown in FIG. 1 and the and coding based on the JPEG-2000 of the arithmetic coding unit 6 were explained with reference to an actual example. Note that in the present embodiment, the coding pass generation unit 5 codes each block independently and measures the statistical quantities for arithmetic coding closed inside the respective coding blocks (code block in the above example).

Next, the later processing of the image coding device shown in FIG. 1 will be explained. The quantization coefficients 105 output from the quantization coefficient substitution unit 4 are input to the bit-plane coding pass generation unit 5 where the quantization coefficients are spread into bit-planes. The bit-plane coding pass information 106 is sent to the arithmetic coding unit 6. The arithmetic coding unit 6 generates the arithmetic codes 107 based on probability calculation. Furthermore, the code quantity control unit 7 counts the code quantity of the arithmetic codes 107 output from the arithmetic coding unit 6 and controls the code quantity so as to approach the target bit rate or compression rate. Specifically, the code quantity can be controlled by truncating part or all of the coding passes in each code block. After completion of the control of the code quantity, the arithmetic codes 108 are supplied to the header generation unit 8 and the arithmetic code extraction unit 9.

Receiving the input of the arithmetic codes 108 after completion of control of the code quantity, the header generation unit 8 for example generates additional information inside the code block of the arithmetic codes 108 as the header 109. The additional information includes, for example, the number of the coding passes in the code block or the data length of the compressed code stream. Furthermore, it is also possible to use the packet header defined by the JPEG-2000 standard as it is.

On the other hand, the arithmetic code extraction unit 9 extracts the arithmetic codes 108 after completion of control of the code quantity from the coding passes. The extracted arithmetic codes 110 are input to the packet generation unit 10. The packet generation unit 10 outputs a packet 111 having the arithmetic codes 110 extracted by the arithmetic code extraction unit 9 added to the header 109 output from the header generation unit 8.

Next, the detailed operation of the substitution processing performed by the quantization coefficient substitution unit 4 will be explained.

As described above, the coefficient storage unit 3 stores the quantization coefficients of one frame before of the input moving image signal.

Figure 6:
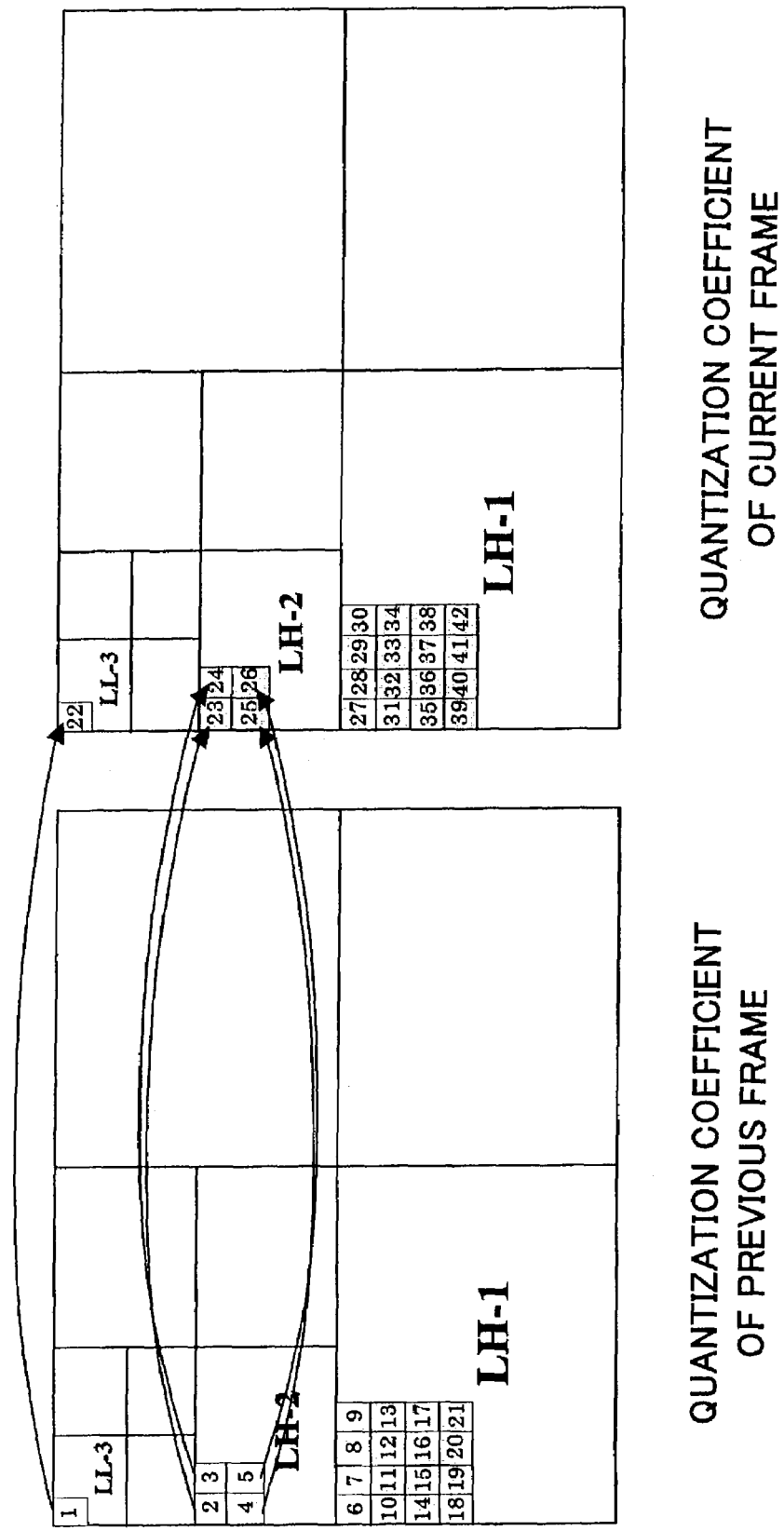
FIG. 6 is a view of the substitution processing of quantization coefficients between two adjoining frames.

FIG. 6 shows an example of application of a wavelet transform three times to generate 10 sub-bands. Among these, note the quantization coefficients in the three sub-bands of LH-1, LH-2, and LL-3. For example, in the view of the quantization coefficients of one frame before shown at the left of FIG. 6, the quantization coefficients corresponding to the quantization coefficient "1" in LL-3 are "2", "3", "4", and "5" in LH2 and "6", "7", . . . "20", and "21" in LL-1.

In the same way, in the view of the present quantization coefficients shown at the right of FIG. 6, the quantization coefficients corresponding to the quantization coefficient "22" in LL-3 are "23", "24", "25", and "26" in LH-2 and "27", "28", . . . "41", and "42" in LL-1.

Figure 7:
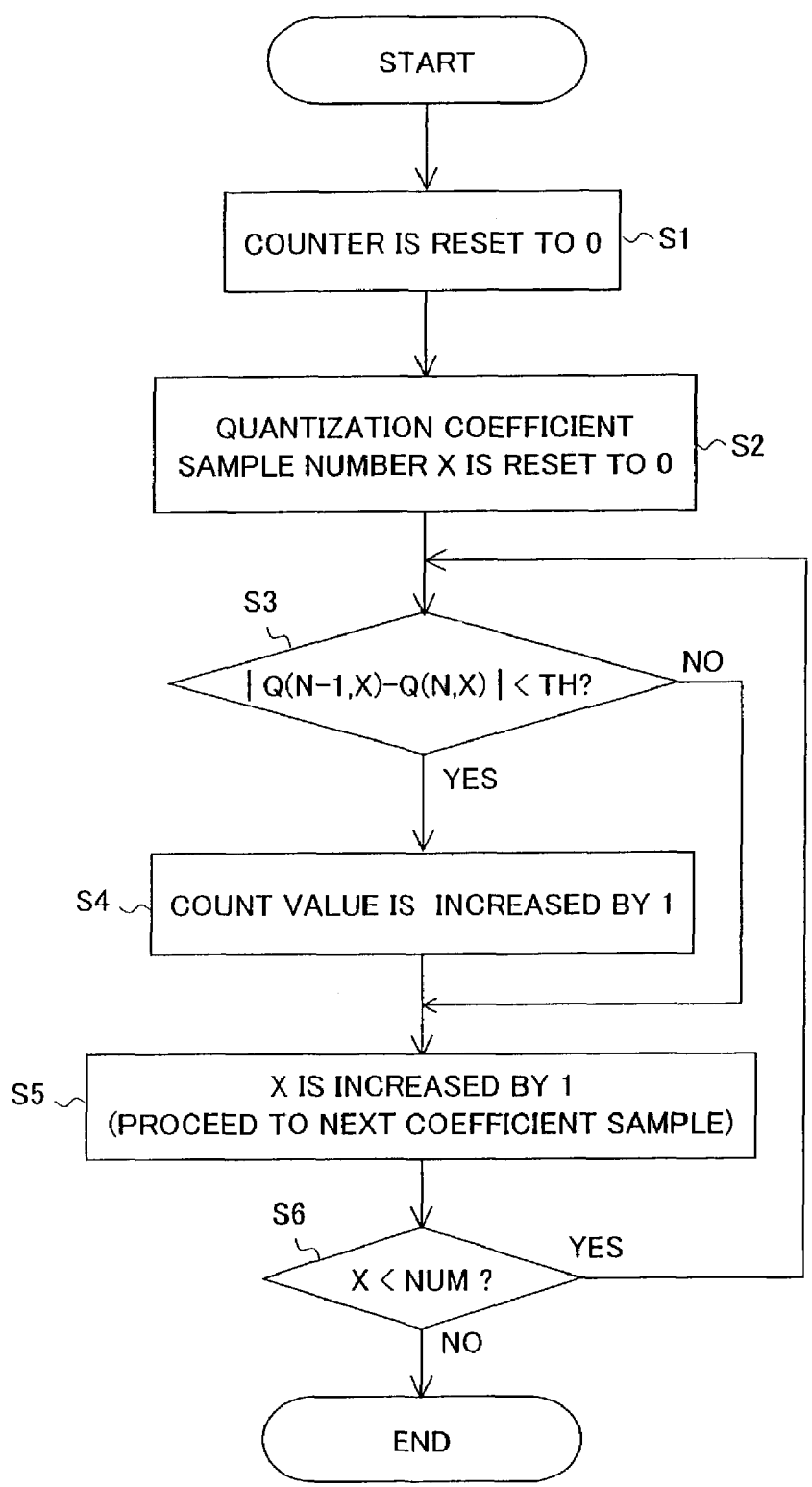
FIG. 7 is a flow chart of the substitution processing according to a comparison of the quantization coefficients.

FIG. 7 is a flow chart of processing for substitution of the quantization coefficients in the quantization coefficient substitution unit 4. Next, the substitution process of the quantization coefficient substitution unit 4 will be explained with reference to FIG. 7.

First, the counter is reset to 0, then the quantization coefficient sample number X is reset to 0 (steps S1 and S2).

Next, the difference ΔQ of absolute value from each of the quantization coefficients of the previous frame stored in the coefficient storage unit 3, for example, the quantization coefficients 1 to 21 and 22 to 42 shown in FIG. 6, is found using the quantization coefficient of the present frame at the same position.

The absolute value difference ΔQ is compared with a preset threshold value TH (step S3). If the result of the comparison is that the absolute value difference ΔQ is smaller than the threshold value TH, the count is increased by 1 to include that quantization coefficient in the substitution candidates (step S4). This judgment processing is performed according to the following relation:

$$|Q(N-1,X)-Q(N,X)|<TH \quad (1)$$

In relation 1, N shows the frame number. Therefore, Q(N−1,X) means the quantization coefficient of the sample X in the previous frame, while Q(N,X) means the quantization coefficient of the sample X in the present frame. This processing is performed for all quantization coefficients X. That is, if the total number of the quantization coefficients is NUM, the processing is performed repeatedly until X=NUM. Note that in the example shown in FIG. 6, the value of NUM is 21.

Among the final 21 samples as a result of the processing shown in FIG. 7, there are exactly the counter value of quantization coefficients satisfying the condition of the threshold value processing, that is, relation 1. Therefore, when the value of this counter is M, judgment is performed as showing in the next relation:

$$M/NUM>Y \ (\%) \quad (2)$$

That is, the left side of relation 2 shows the ratio of the number M of the quantization coefficients which satisfy the condition shown in relation 1 among the NUM number of the quantization coefficients. If this ratio is higher than the preset predetermined value Y, the quantization coefficients 102 of the present frame are replaced by the quantization coefficients 104 of the previous frame. Specifically, in the example of FIG. 6, the quantization coefficient "22" of the present frame is replaced by "1"; the coefficients of "23", "24", "25", and "26" are replaced by "2", "3", "4", and "5"; and the coefficients of "27", "28", . . . "41" are replaced by "16", "7", . . . "20", "21", respectively.

The above processing is performed for all of the quantization coefficients of the sub-band LL-3 to replace quantization coefficients for the quantization coefficients satisfying the condition.

Figure 8B:
FIGS. 8A to 8C give examples of images showing the result of the substitution processing according to the present embodiment.
Figure 8A:
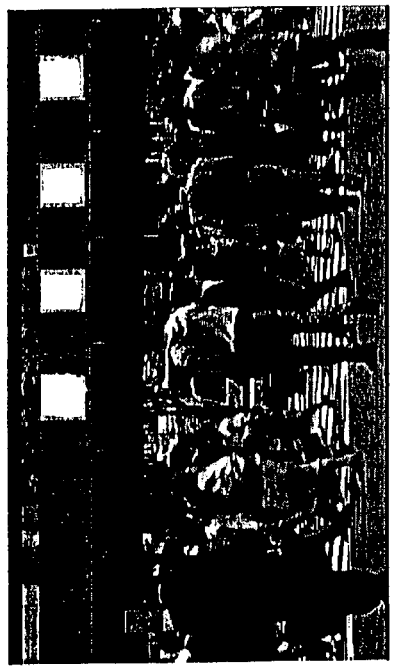
Figure 8C:

FIGS. 8A to 8C show an example of use of the above processing for an actual test image. Note that, FIGS. 8A and 8B show the images of two consecutive frames in a moving image signal, wherein FIG. 8A shows the image of one frame before and FIG. 8B shows the image of the present frame. FIG. 8C shows the result of the quantization coefficient substitution judgment. Here, the black portions show the parts where processing for substitution of the quantization coefficients is performed according to the result of the above-mentioned processing.

As shown in FIGS. 8A to 8C, the pedestrians move quickly at random, but the camera is fixed and the background does not move at all. Noise, however, is generated slightly differently depending on the frame, so even in a still region, the values of the quantization coefficients will vary between frames.

As described above, according to the image coding device and coding method of the present embodiment, processing is performed for substitution of quantization coefficients between adjacent frames in a moving image signal based on whether the difference between quantization coefficients satisfies a predetermined condition. According to this, fluctuation in the quantization coefficients is suppressed in the background part of a moving image and other parts of the image where there is little movement. For example, in the example of images shown in FIGS. 8A to 8C, it is understood that the background portion is selected as the region for substitution of quantization coefficients (black parts in FIG. 8C). Due to the processing for substitution of quantization coefficients, fluctuation in the quantization coefficients between frames is suppressed at the image of the background portion where there is little movement and flicker noise can be decreased.

Second Embodiment

Figure 9:
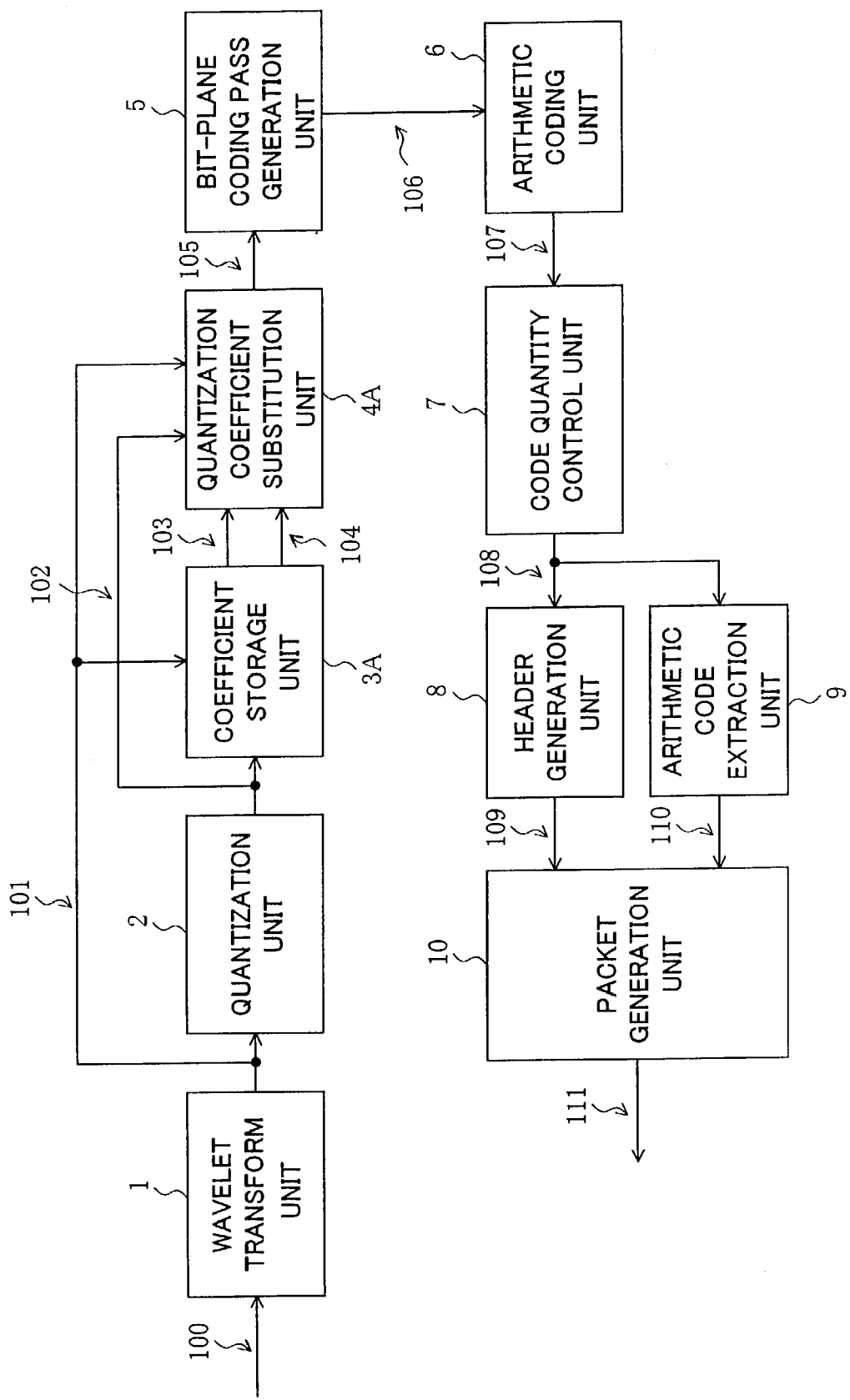
FIG. 9 is a block diagram of an image coding device according to a second embodiment of the present invention.

FIG. 9 is a block diagram of an image coding device according to a second embodiment of the present invention.

As illustrated, the image coding device of the present invention has substantially the same configuration as the image coding device of the first embodiment shown in FIG. 1. However, in the image coding device of the first embodiment shown in FIG. 1, the coefficient storage unit 3 only stored the quantization coefficients 102 output from the quantization unit 2. In the image coding device of the present embodiment, a coefficient storage unit 3A stores not only quantization coefficients 102 output from the quantization unit 2, but also wavelet transform coefficients 101 output from a wavelet transform unit 1.

As shown in FIG. 9, the wavelet transform coefficients 101 generated by the wavelet transform unit 1 are supplied to the quantization unit 2, the coefficient storage unit 3A, and a quantization coefficient substitution unit 4A.

The quantization unit 2, in the same way as the quantization unit 2 of the first embodiment of the present invention, quantizes the wavelet transform coefficients 101 and outputs the quantization coefficients 102.

The coefficient storage unit 3A stores the wavelet transform coefficients 101 from the wavelet transform unit 1 and quantization coefficients 102 from the quantization unit 2.

The quantization coefficient substitution unit 4A performs processing for substitution of quantization coefficients in accordance with the wavelet transform coefficients 103 and quantization coefficients 104 of one frame before and the wavelet transform coefficients 101 and the quantization coefficients 102 of the present frame stored in the coefficient storage unit 3A.

As described above, the image coding device of the present embodiment differs from image coding device of the first embodiment in the point that the coefficient storage unit 3A stores the wavelet substitution coefficients 101 and the quantization coefficients 102. In addition, the processing for substitution of quantization coefficients in the quantization coefficient substitution unit 4A differs from the processing for substitution of the first embodiment. In the present embodiment, the quantization coefficient substitution unit 4A performs the processing for substitution of quantization coefficients while referring to both the quantization coefficients of the previous frame and the present frame and the wavelet transform coefficients of the previous frame and the present frame.

Next, the processing for substitution process of the quantization coefficients in the quantization coefficient substitution unit 4A of the image coding device of the present embodiment will be explained.

Here, first, the relationship between the wavelet transform coefficients and the quantization coefficients in the image coding device of the present embodiment will be explained with reference to FIG. 10.

Figure 10:
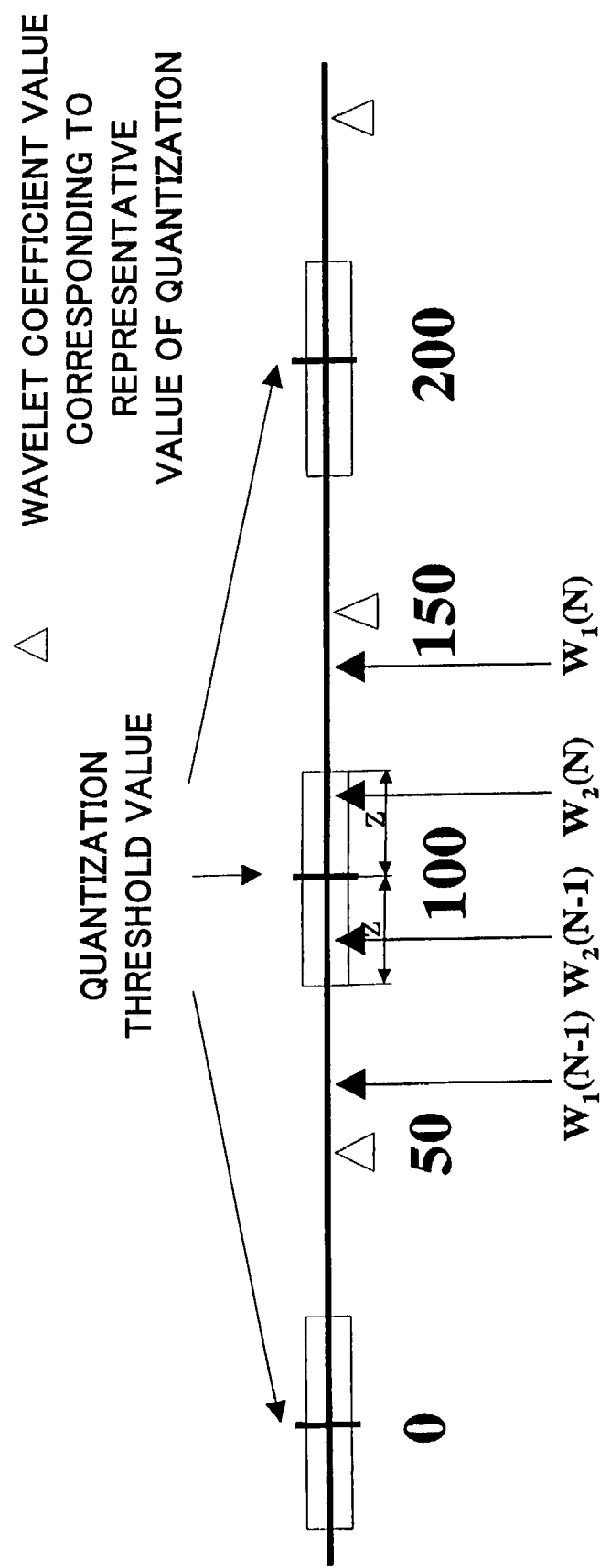
FIG. 10 is a view explaining comparison of wavelet transform coefficients and judgment of substitution.

FIG. 10 is a view of the values of the wavelet coefficients corresponding to the representative values of quantization of the image coding device of the present embodiment. As shown in FIG. 10, $W_1(N-1)$ and $W_2(N-1)$ are wavelet transform coefficients of the previous frame, while $W_1(N)$ and $W_2(N)$ are wavelet transform coefficients of the present frame.

As shown in FIG. 10, for example, the quantization value when quantizing the wavelet transform coefficient $W_1(N-1)$ becomes $\Delta(\mathbf{50})$, while the quantization value when quantizing the wavelet transform coefficient $W_1(N)$ becomes $\Delta(\mathbf{150})$. Therefore, in this case, these do not become candidates for substitution of quantization coefficients.

On the other hand, the quantization value when quantizing $W_2(N-1)$ becomes $\Delta(\mathbf{50})$, while the quantization value when quantizing $W_2(N)$ becomes $\Delta(\mathbf{150})$, the same as the above, but when setting threshold values of z at the left and right of the center of the quantization threshold value (position of 100) and both of $W_2(N-1)$ and $W_2(N)$ fall within these threshold values (having a width of 2z), $W_2(N)$ is set as the candidate for replacement by $W_2(N-1)$. Here, the value of the threshold value z should be set first.

Here, it is also possible to set as the final quantization substitution coefficients those of the quantization coefficients selected as substitution candidates in the substitution means of the quantization coefficients of the previous frame and the quantization coefficients of the present frame explained in the first embodiment of the present invention which are also selected as substitution candidates by the quantization substitution means using the wavelet transform coefficients of the present embodiment.

Figure 11:
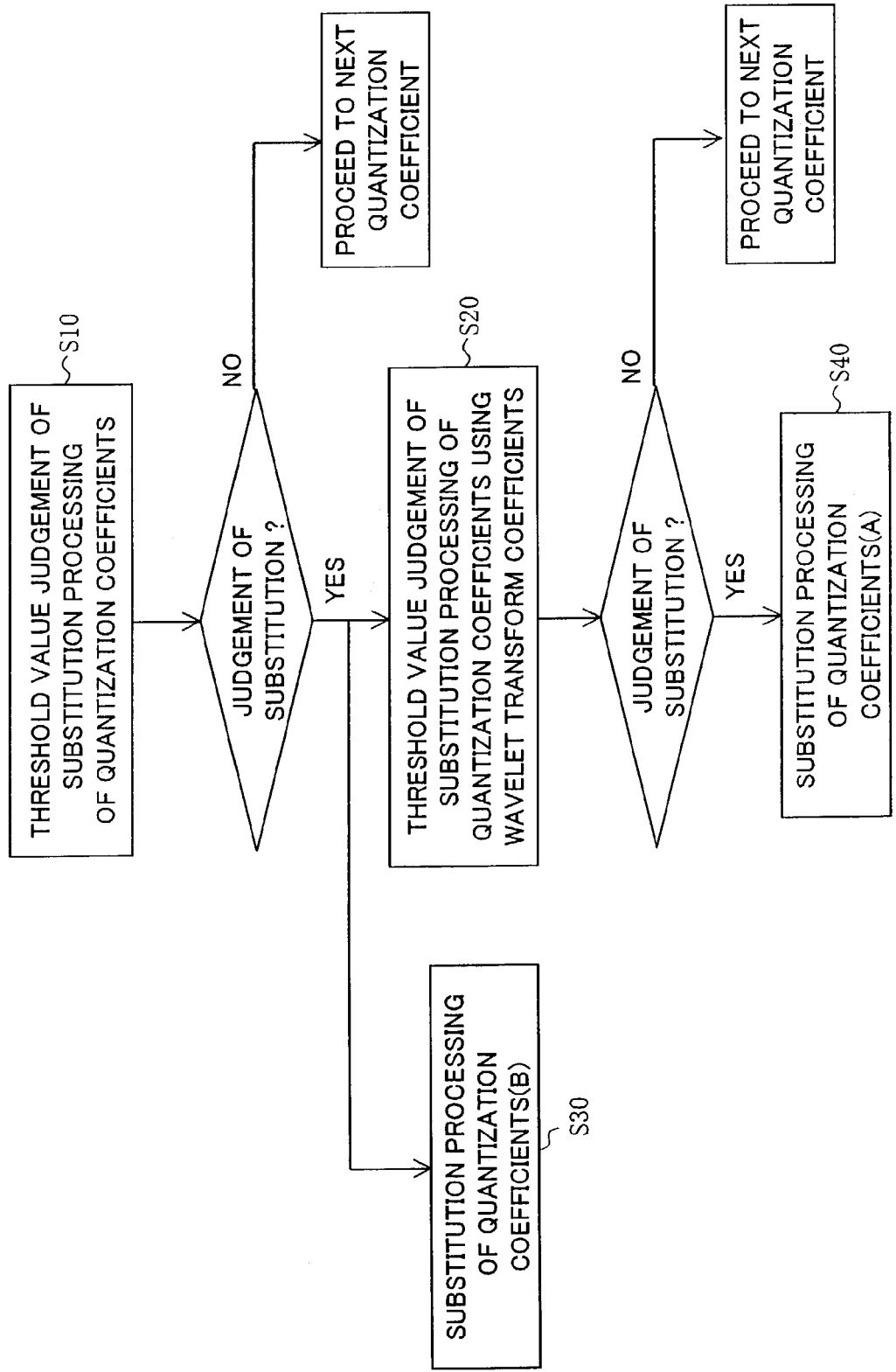
FIG. 11 is a flow chart of a means for substitution of quantization coefficients combining comparison of quantization coefficients and comparison of wavelet transform coefficients.

FIG. 11 is a flow chart of the operation of the quantization coefficient substitution unit 4A in the image coding device of the present embodiment. Next, the operation of the quantization coefficient substitution unit 4A will be explained with reference to FIG. 11.

First, at step S10, judgment of substitution between quantization coefficients explained in the first embodiment is performed. When the result of judgment is YES (replace), the routine proceeds to the next step, where judgment of processing of substitution of quantization coefficients using wavelet transform coefficients is performed (step S20). When the result of judgment using the wavelet transform coefficients is YES (replace), the processing for substitution of quantization coefficients is performed (step S40).

However, the processing for threshold judgment does not have to be performed in two steps as explained above. It is also possible to immediately perform the processing for substitution of quantization coefficients at the time when the result of judgment of replacement is obtained at first step S10 (step S30). This corresponds to the processing of the first embodiment described above.

The quantization coefficient substitution unit 4A can realize the processing for substitution of quantization coefficients by the above substitution processing based on the wavelet transform coefficients and quantization coefficients of the previous frame and the wavelet transform coefficients and quantization coefficients of the present frame. According to this, large fluctuation in the quantization coefficients between frames can be suppressed and the flicker noise can be decreased. Further, by comparison using the wavelet transform coefficients, the precision of the judgment of the substitution processing can be improved and the rate of erroneous judgment of the processing for substitution of the quantization coefficients can be reduced.

Summarizing the effects of the invention, as described above, according to the image coding device and coding method of the present invention, the flicker noise considered a visual problem can be greatly reduced in coding of moving images based on the Motion JPEG-2000. Particularly, the present invention is effective in stabilizing and reducing flicker noise when the quantization coefficients change slightly between frames due to the effect of noise entering due to the camera or other factors despite the camera actually being still.

Further, according to the present invention, there is the advantage that the precision of the judgment of the substitution process can be improved and erroneous detection can therefore be decreased by not only comparison between quantization coefficients at the same spatial position in adjoining frames, but also comparison using wavelet transform coefficients between adjoining frames.

While the invention has been described with reference to specific embodiments chosen for purpose of illustration, it should be apparent that numerous modifications could be made thereto by those skilled in the art without departing from the basic concept and scope of the invention.

What is claimed is:

1. An image coding device comprising:
   wavelet transform means for applying to an input image low-pass filtering and high-pass filtering in at least one of a vertical and horizontal direction,
   quantization means for quantizing transform coefficients generated by the wavelet transform means to generate quantization coefficients,
   storage means for storing the quantization coefficients,
   substitution means for comparing the stored quantization coefficients and the quantization coefficients of the current image for coding and replacing the quantization coefficients of the current image for coding with the stored quantization coefficients in accordance with the result of the comparison,
   spreading means for spreading the quantization coefficients output from the substitution means into bit-planes from the most significant bit (MSB) to least significant bit (LSB),
   coding pass generation means for generating coding passes for each bit-plane, and
   coding means for arithmetic coding of the coding passes.

2. An image coding device as set forth in claim 1, wherein said substitution means has means for calculating a difference of absolute values between a quantization coefficient stored in said storage means and a quantization coefficient of the current image for coding and replacing the quantization coefficients when the difference of absolute values is smaller than a predetermined threshold value.

3. An image coding device as set forth in claim 1, wherein said substitution means has difference processing means for calculating a difference of absolute values of quantization coefficients at the same spatial positions of a sub-band generated by the wavelet transform means.

4. An image coding device as set forth in claim 3, wherein said substitution means replaces the quantization coefficients when a ratio of the number of quantization coefficients having differences of absolute value calculated by the difference processing means smaller than a predetermined threshold value in the overall number of quantization coefficients is larger than a predetermined threshold value.

5. An image coding device as set forth in claim 1, wherein said wavelet transform means comprises:
   storage means for storing image data of a predetermined image region and
   filtering means for applying to said storage image data wavelet transform filtering in the horizontal or vertical direction.

6. An image coding device as set forth in claim 1, wherein said quantization means divides said wavelet transform coefficients by a quantization step size of a scalar value to calculate said quantization coefficients.

7. An image coding device as set forth in claim 1, further comprising code quantity control means for controlling a code quantity to a target code quantity according to arithmetic codes generated by the coding means.

8. An image coding device as set forth in claim 1, wherein said coding pass generation means generates coding passes in each coding block of a predetermined size.

9. An image coding device as set forth in claim 8, further comprising code quantity control means for discarding part of all of the coding passes in each coding block according to the target code quantity.

10. An image coding device as set forth in claim 1, further comprising packet generation means for adding a header to the arithmetic codes generated by the coding means to generate a packet.

11. An image coding device, comprising:
    wavelet transform means for applying to an input image low-pass filtering and high-pass filtering in at least one of a vertical or horizontal direction and outputting wavelet transform coefficients,
    quantization means for quantizing the transform coefficients generated by the wavelet transform means and outputting quantization coefficients,
    storage means for storing said wavelet transform coefficients and said quantization coefficients,
    substitution means for comparing a stored quantization coefficient and a quantization coefficient of a current image for coding and further comparing a stored wavelet transform coefficient and a wavelet coefficient of a current image for coding and replacing the quantization coefficient of the current image for coding with said stored quantization coefficient in accordance with the results of the comparisons,
    spreading means for spreading the quantization coefficients output from the substitution means into bit-planes from the most significant bit (MSB) to least significant bit (LSB),
    coding pass generation means for generating coding passes for each bit-plane, and
    coding means for arithmetic coding in the coding passes.

12. An image coding device as set forth in claim 11, wherein said substitution means compares a stored wavelet transform coefficient and a wavelet transform coefficient of the current image for coding at the same spatial positions in a sub-band generated by the wavelet transform and replaces the quantization coefficient of the current image for coding with said stored quantization coefficient when the values of both of the wavelet transform coefficients are within a range of a predetermined span.

13. An image coding device as set forth in claim 11, wherein said substitution means has means for calculating a difference of absolute values between a quantization coefficient stored in said storage means and a quantization coefficient of the current image for coding and replaces the quantization coefficients when the difference of absolute values is smaller than a predetermined threshold value.

14. An image coding device as set forth in claim 11, wherein said substitution means includes difference processing means for calculating a difference of absolute values of quantization coefficients at the same spatial positions of a sub-band generated by the wavelet transform means.

15. An image coding device as set forth in claim 14, wherein said substitution means replaces the quantization coefficients when a ratio of the number of quantization coefficients having differences of absolute value calculated by the difference processing means smaller than a predetermined threshold value in the overall number of quantization coefficients is larger than a predetermined threshold value.

16. An image coding device as set forth in claim 11, wherein said wavelet transform means comprises: storage means for storing image data of a predetermined image region and filtering means for applying to said storage image data wavelet transform filtering in the horizontal or vertical direction.

17. An image coding device as set forth in claim 11, wherein said quantization means divides said wavelet transform coefficients by a quantization step size of a scalar value to calculate said quantization coefficients.

18. An image coding device as set forth in claim 11, further comprising code quantity control means for controlling a code quantity to a target code quantity according to arithmetic codes generated by the coding means.

19. An image coding device as set forth in claim 11, wherein said coding pass generation means generates coding passes in each coding block of a predetermined size.

20. An image coding device as set forth in claim 19, further comprising code quantity control means for discarding part of all of the coding passes in each coding block according to the target code quantity.

21. An image coding device as set forth in claim 11, further comprising packet generation means for adding a header to the arithmetic codes generated by the coding means to generate a packet.

22. An image coding method comprising the steps of:
applying to an input image low-pass filtering and high-pass filtering in at least one of a vertical and horizontal direction to generate wavelet transform coefficients,
quantizing the wavelet transform coefficients generated by the wavelet transform to generate quantization coefficients,
storing the quantization coefficients,
comparing a stored quantization coefficient and a quantization coefficient of a current image for coding and replacing the quantization coefficient of the current image for coding with said stored quantization coefficient in accordance with the results of the comparison,
spreading the quantization coefficients obtained from the substitution processing into bit-planes from the most significant bit (MSB) to least significant bit (LSB), generating coding passes for each bit-plane, and performing arithmetic coding in the coding passes.

23. An image coding method as set forth in claim 22, wherein said substitution step calculates a difference of absolute values between a stored quantization coefficient and a quantization coefficient of the current image for coding and replaces the quantization coefficients when the difference of absolute values is smaller than a predetermined threshold value.

24. An image coding method comprising the steps of:
applying to an input image low-pass filtering and high-pass filtering in at least one of a vertical and horizontal directions to generate wavelet transform coefficients,
quantizing the wavelet transform coefficients and outputting quantization coefficients,
storing the wavelet transform coefficients and the quantization coefficients,
comparing a stored quantization coefficient and a quantization coefficients of the current image for coding and further comparing a stored wavelet transform coefficient and a wavelet transform coefficients of the current image for coding and replacing the quantization coefficient of the current image for coding with the stored quantization coefficient in accordance with the results of the comparisons,
spreading the quantization coefficients output from the substitution processing into bit-planes from the most significant bit (MSB) to least significant bit (LSB),
generating coding passes for each bit-plane, and
performing arithmetic coding in the coding passes.

25. An image coding method as set forth in claim 24, wherein said substitution step compares a stored wavelet transform coefficient and a wavelet transform coefficient of the current image for coding at the same spatial positions in a sub-band generated by the wavelet transform and replaces the quantization coefficient of the current image for coding with said stored quantization coefficient when the values of both of the wavelet transform coefficients are within a range of a predetermined span.

* * * * *